United States Patent [19]

Bertrand et al.

[11] 4,321,680

[45] Mar. 23, 1982

[54] SPECTRUM ANALYZER WITH FREQUENCY BAND SELECTION

[75] Inventors: John Bertrand, Upper Nyack; Joseph H. Flink, Monsey; Daniel Shamah, Bardonia; Rodger H. Hosking, Nyack, all of N.Y.

[73] Assignee: Wavetek Rockland Inc., Rockleigh, N.J.

[21] Appl. No.: 142,719

[22] Filed: Apr. 22, 1980

[51] Int. Cl.³ .................. G06F 15/31; G01R 23/16
[52] U.S. Cl. .................. 364/485; 324/77 B; 364/576
[58] Field of Search .......... 364/485, 576, 726; 324/77 B, 77 CS, 77 D

[56] References Cited

U.S. PATENT DOCUMENTS 3,876,946  4/1975  La Clair et al. .......... 364/485 X
3,881,097  4/1975  Lehmann et al. .......... 364/485 X
4,054,785  10/1977  Lehmann .......... 324/77 D X
4,057,756  11/1977  Ley et al. .......... 324/77 B
4,093,989  6/1978  Flink et al. .......... 364/485

OTHER PUBLICATIONS

"Rockland Operating Manual Model 7530A FFT Spectrum Analyzer", Rockland Systems Corporation, 1979.
"A 5 MHz Digitally Controlled Spectrum Analyzer", Tekscope (USA), vol. 7, No. 3, 1975, pp. 3-7.

*Primary Examiner*—Jerry Smith
*Attorney, Agent, or Firm*—Frishauf, Holtz, Goodman and Woodward

[57] ABSTRACT

A spectrum analyzer for FFT analyzing and displaying the frequency spectrum of a digital signal over a given frequency band (background), as well as over a more limited frequency band (foreground). The spectrum of the signal over each frequency band is calculated and displayed so as to appear on a screen as a simultaneous display. The position of the limited frequency band as well as the width thereof, may be varied.

7 Claims, 6 Drawing Figures

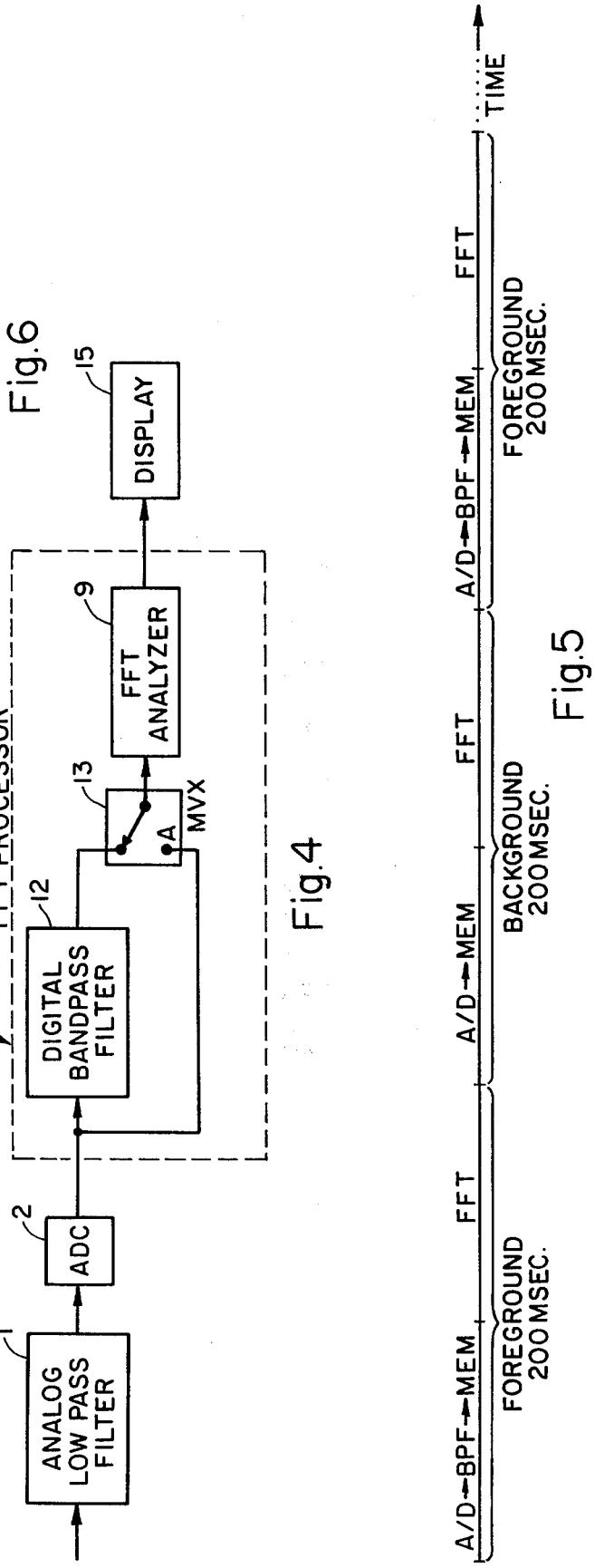

SPECTRUM ANALYZER WITH FREQUENCY BAND SELECTION

CROSS REFERENCES

The entire contents of U.S. Pat. No. 4,093,989, including the entire contents of the literature references listed in column 1 of U.S. Pat. No. 4,093,989, are incorporated herein by reference.

Operating Manual for Model 7530A FFT Spectrum Analyzer manufactured by Rockland Systems Corporation, Rockleigh, N.J., 1979.

BACKGROUND OF THE INVENTION

This invention relates to a spectrum analyzer, and more particularly to a spectrum selection device for a spectrum analyzer.

In present spectrum analyzer, the user generally selects a starting frequency and a frequency window of a spectrum based on experience or by first performing a spectrum analysis over a wide frequency band in order to identify a region for which more detail or resolution is of interest. Then, the operator switches to a narrow frequency band (or frequency window) of the wide frequency band to obtain more resolution. Unfortunately, after the user switches to a higher resolution mode, the spectrum may change and it may then be desireable to move the higher resolution analysis window to a new frequency band. This sometimes is not obvious to the user.

The object of the present invention is to provide a spectrum analyzer, such as a Fast Fourier Transform (FFT) based spectrum analyzer wherein the user can simultaneously view the wide and narrow (window) frequency bands so that the user is always aware of the best or more desireable frequency region to select for the higher resolution frequency band (frequency window).

SUMMARY OF THE INVENTION

According to the present invention, a spectrum analyzer comprises a source of a digital input signal to be spectrum analyzed; an FFT spectrum analyzer for spectrum analyzing digital signals; digital bandpass filter means coupled to said input signal source for bandpass filtering the digital input signal; means coupled to the bandpass filter means for varying at least one of the center frequency of the bandpass filter means and the band width of the bandpass filter means; switching means for alternately coupling the digital input signal and the output of the digital bandpass filter means to the FFT analyzer for alternately FFT analyzing the digital input signal and the output of the digital bandpass filter means; and display means for concurrently displaying the analyzed spectrum of the input signal and of the output of the bandpass filter means.

BRIEF DESCRIPTION OF THE DRAWINGS

FIG. 3 is a functional block diagram of the system operating in a mode to spectrum analyze a wide frequency band or "background";

FIG. 4 is a simplified functional block diagram of the system;

FIG. 5 illustrates the sequence of operations carried out by the apparatus of the present invention; and FIG. 6 illustrates an oscilloscope trace showing simultaneous display of wide (background) and narrow (foreground) frequency bands.

DETAILED DESCRIPTION

Figure 1:
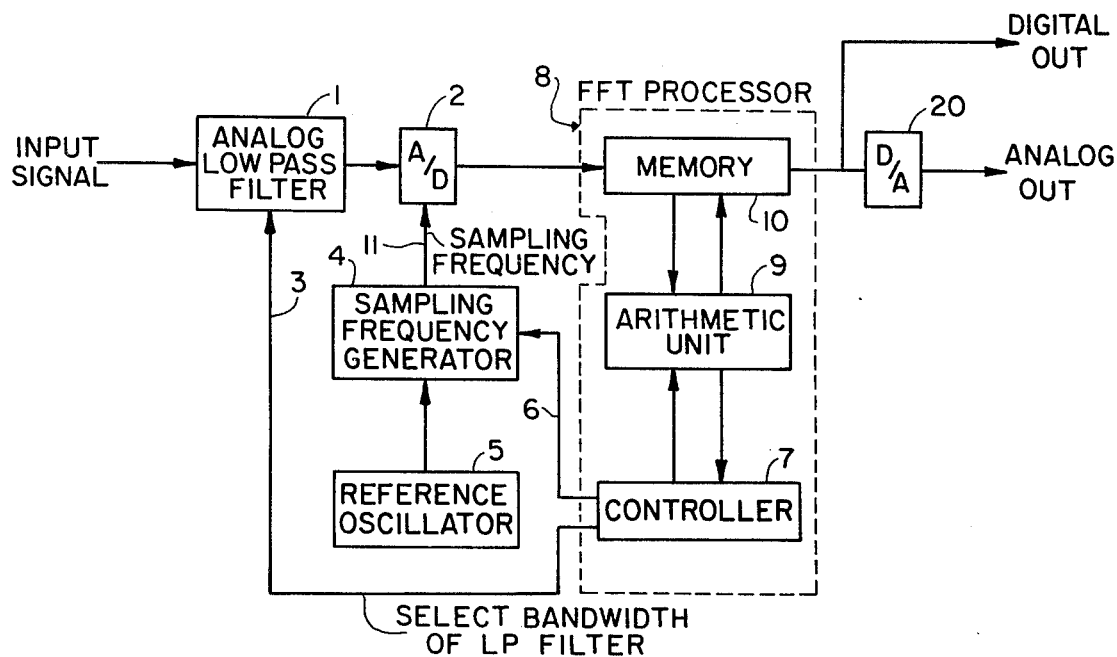
FIG. 1 is a block diagram of a spectrum analyzer using FFT.

Referring to FIG. 1, an analog signal to be spectrum analyzed is coupled to the input of an analog low pass filter 1, the output of which is coupled to an analog-to-digital (A/D) converter 2. The filter 1 has a sharp roll-off and restricts the signal band width to less than half the sampling rate of the A/D converter to avoid aliasing errors. The bandpass of the analog low pass filter is controlled by means of an output line 3 from a controller 7. The A/D converter 2 receives a sampling frequency signal from sampling frequency generator 4 which receives a reference signal from reference oscillator 5. The sampling frequency appearing at line 11, generated by the sampling frequency generator 4, is determined by an output signal on line 6 from the controller 7 which forms part of the FFT processor 8.

The FFT processor 8 comprises an arithmetic unit 9 which is programmed to perform FFT calculations on an input signal received from memory 10, and to store the FFT data back in memory locations in memory 10. The controller 7 controls the arithmetic unit and also controls the sampling frequency generator 4 and low pass filter 1 so as to provide FFT processing of the input signal. The output from the processor 8 is in a digital format, or can be converted by a D/A converter 20 into an analog signal format. The system of FIG. 1 is essentially similar to the system of FIG. 3 of U.S. Pat. No. 4,093,989. The entire contents of U.S. Pat. No. 4,093,989, and of the literature references listed in column 1 thereof, are incorporated herein by reference.

Figure 2:
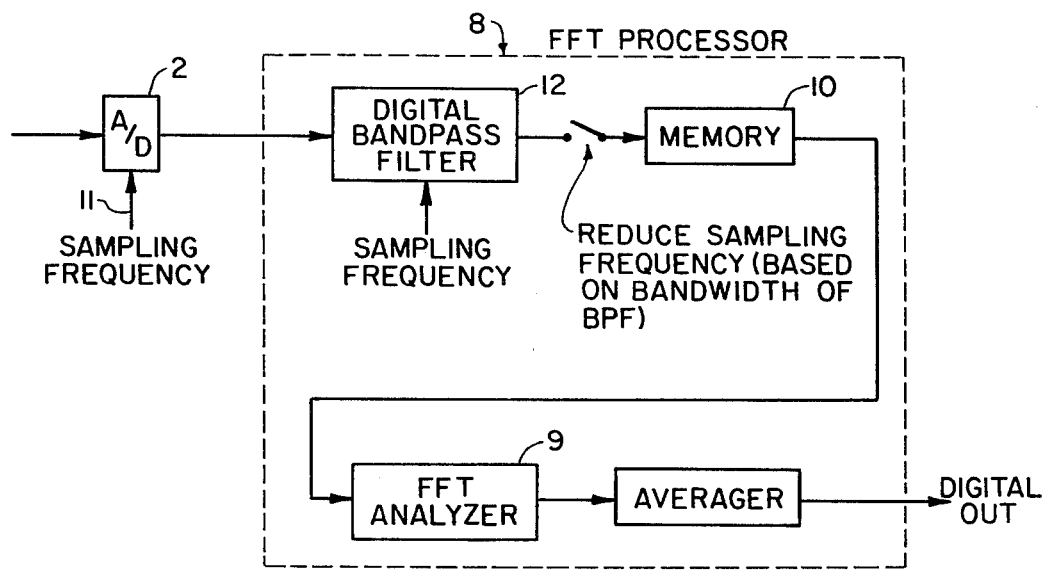
FIG. 2 is a functional block diagram of the system operating in a mode to spectrum analyze a given frequency window or "foreground"

FIG. 2 is a functional block diagram of the system of FIG. 1 when it is operating in the foreground (window) computational mode. In FIG. 2, the processor 8 is shown in functional form. That is, the arithmetic unit and controller shown in FIG. 1 are shown by blocks indicating the functions which are being performed thereby. More particularly, the digital bandpass filter 12 shown in FIG. 2 is being simulated by means of the FFT processor 8 so as to appear, for example, as the digital bandpass filters such as shown in prior U.S. Pat. No. 4,093,989, FIG. 7. When the operator determines the particular window or reduced frequency band portion of the input signal which is desired to be analyzed in greater detail, the selection is carried out by means of selecting a desired center frequency which determines the position of the window and by selecting a desired sampling rate frequency which determines the width of the window being examined. As the sampling frequency is reduced, the band width of the window being examined as the "foreground" is reduced, thus reducing the size of the window being examined. The bandpass of the analog low pass filter 1 and the A/D sampling rate may be changed to modify the maximum window but are the same for the foreground and background computations.

FIG. 3 is a functional block diagram of the system when operating in the "background" computational mode. In this mode, the system operates substantially as described in prior U.S. Pat. No. 4,093,989. In this mode, the system operates with the highest available sampling frequency and the maximum frequency band is analyzed.

FIG. 4 is a simplified block diagram of the system showing how the system is switched from background to foreground computational modes. The digital bandpass filter 12 in FIG. 4 (also shown in FIG. 2) is equivalent to a tuneable bandpass filter which permits selecting a portion of the spectrum to be analyzed. The tuning and span controls of the spectrum analysis instrument selects the center frequency and band width of the digital bandpass filter 12, to thereby select the position and width, respectively of the window to be analyzed. The switching between the functional block diagram of FIGS. 2 and 3, to provide foreground and background computations, respectively, is accomplished by means of a switching device 13 which is symbolically shown in FIG. 4. Switching device 13 is actually simulated electronically in the FFT processor 8 by means of, for example, the controller 7 and/or arithmetic unit 9. A multiplexing device could also be used for switch 13. When switch 13 is in the position shown in FIG. 4, the system is in the foreground computational mode. When switch 13 is switched to position A in FIG. 4, the system is switched to the background computational mode. The display device 15 comprises, for example, an oscilloscope. FIG. 5 illustrates the operational sequence of the system on a time base.

FIG. 6 illustrates a typical oscilloscope display trace. FIG. 6 shows two traces; a subdued "background" trace covering the analysis from 0 to 100 KHz, and a brighter "foreground" trace covering the analysis of a 2000 Hz window starting at 44.40 KHz. A portion of the "background" trace is brightened in the display, the brightened portion corresponding to the analysis window of the "foreground" trace. The operator can move the position of the brightened portion of the background trace by turning a tuning control, and can control the widths of the analysis window by changing a span or resolution selector on the instrument. Varying the width of the analysis window is accomplished, as discussed above, by varying the sampling frequency, and therefore the bandpass, of the digital bandpass filter 12. The brightening of the oscilloscope trace over the frequency range of the "foreground" may be accomplished by controlling the intensity of the electron beam of the oscilloscope over the frequency range of the window. This may be accomplished by means of a Z-axis modulator which is controlled by a memory which stores information corresponding to the frequencies being analyzed in the foreground window. Alternatively, the trace may be "slowed down" at the portions of the trace corresponding to the foreground window, thus brightening the display to indicate the foreground window.

The basic device described briefly above, used for spectrum analysis is a special purpose computing device which calculates the Fourier transform of the input data using the FFT algorithm. The FFT synthesizes a bank of contiguous filters, for example 200 for a typical instrument, each with a nominal bandwidth of 1/200 of the analysis span. Therefore, the 0–100 KHz background is analyzed with 500 Hz resolution and the 2000 Hz wide foreground with 10 Hz resolution. Because the FFT performs the analysis in a very short time, it is multiplexed (switch 13 - FIG. 4) to perform analysis first for data corresponding to the 100 KHz band (background) and then for data corresponding to the selected 2000 Hz span (foreground). As a result, the two spectrum appear to be analyzed simultaneously. It is possible to use two Fourier transform calculating devices so that simultaneous data are analyzed.

In a typical spectrum analyzer according to the present invention, the switching rate of the switching means 13 of FIG. 4 is such that the FFT processor 8 processes the direct input signal (switch position A in FIG. 4) for a period of 200 milliseconds, and then processes the output of the digital bandpass filter for a period inversely proportional to the bandwidth of the filter and at least equal to 200 milliseconds. The alternate analysis is displayed on the oscilloscope, for example as shown in FIG. 6 so as to appear as a simultaneous analysis display. The display of the foreground (window) is in the lower portion of the screen in FIG. 6 with an expanded frequency base.

We claim:

1. Spectrum analyzer comprising:
   a source of a digital input signal to be spectrum analyzed;
   an FFT spectrum analyzer for spectrum analyzing digital signals;
   digital bandpass filter means coupled to said input signal source for bandpass filtering said digital input signal;
   means coupled to said bandpass filter means for varying at least one of the center frequency of said bandpass filter means and the band width of said bandpass filter means;
   switching means for alternately coupling said digital input signal and the output of said digital bandpass filter means to said FFT analyzer for alternately FFT analyzing the digital input signal and the output of said digital bandpass filter means; and
   display means for concurrently displaying the analyzed spectrum of said input signal and of the output of said bandpass filter means.

2. Spectrum analyzer according to claim 1 wherein said display means displays the output of said bandpass filter in a frequency expanded state.

3. Spectrum analyzer according to claim 1 wherein said display means displays the spectrum of said input signal in a subdued trace, the portion of the spectrum of said input signal corresponding to the output of said bandpass filter being displayed as part of said spectrum of said input signal, but in a brightened state.

4. The spectrum analyzer according to claim 1 wherein said varying means includes means for varying both the center frequency of said bandpass filter and the band width of said bandpass filter.

5. Spectrum analyzer according to claim 1 wherein the output of said bandpass filter corresponds to a "window" in said digital input signal, the position of said "window" being determined by the center frequency of said bandpass filter, and the width of said "window" being determined by the band width of said bandpass filter.

6. Spectrum analyzer according to claim 1 wherein said varying means comprises means for coupling a variable sampling frequency to said digital bandpass filter, the sampling frequency determining the band width of said digital bandpass filter.

7. Spectrum analyzer according to claim 1 wherein said display means comprises a cathode ray tube display.

* * * * *